United States Patent [19]

Rix

[11] Patent Number: 4,631,101
[45] Date of Patent: Dec. 23, 1986

[54] APPARATUS AND METHOD FOR FILAMENT WINDING CYLINDRICAL BODIES WITH CLOSED END

[75] Inventor: Clifford Rix, Gosport, England

[73] Assignee: The Secretary of State for Defence in Her Britannic Majesty's Government of the United Kingdom of Great Britain and Northern Ireland, London, England

[21] Appl. No.: 701,529

[22] Filed: Feb. 14, 1985

[30] Foreign Application Priority Data

Feb. 15, 1984 [GB] United Kingdom ............... 8403965

[51] Int. Cl.⁴ ............................................. B65H 81/00
[52] U.S. Cl. ..................................... 156/175; 156/425
[58] Field of Search ................ 156/425, 69, 173, 175, 156/169, 170, 428; 242/7.21, 7.02

[56] References Cited

U.S. PATENT DOCUMENTS

| | | | |
|---|---|---|---|
| Re. 30,489 | 1/1981 | Abbott | 156/175 |
| 3,133,236 | 5/1964 | McCauley | 318/19 |
| 3,228,616 | 1/1966 | Grosh | 242/7.21 |
| 3,378,427 | 4/1968 | McClean | 156/431 |
| 3,380,675 | 4/1968 | Baxter et al. | 156/443 |
| 3,549,454 | 12/1970 | Roberts | 156/425 |
| 3,577,294 | 5/1971 | David | 156/173 |
| 3,676,258 | 7/1972 | Jackson | 156/175 |
| 4,251,036 | 2/1981 | McLain | 242/7.21 |
| 4,529,139 | 7/1985 | Smith et al. | 156/173 |

FOREIGN PATENT DOCUMENTS

| | | |
|---|---|---|
| 0039264A | 6/1981 | European Pat. Off. . |
| 1237767 | 3/1930 | Fed Rep of Germany . |
| 2035541 | 1/1972 | Fed Rep of Germany . |
| 2150553 | 4/1973 | Fed Rep of Germany . |
| 2746290 | 4/1979 | Fed Rep of Germany . |
| 1200813 | 12/1959 | France . |
| 181738 | 6/1966 | Russia . |
| 873174 | 7/1961 | United Kingdom . |
| 0028368 | 3/1979 | Japan .................. 156/173 |
| 1033734 | 6/1966 | United Kingdom . |
| 1510112 | 5/1978 | United Kingdom . |
| 1526863 | 10/1978 | United Kingdom . |
| 2085397A | 4/1982 | United Kingdom . |

Primary Examiner—Michael Ball
Attorney, Agent, or Firm—Stevens, Davis, Miller & Mosher

[57] ABSTRACT

A filament winding machine suitable for winding a hollow closed fibre-reinforced body such as a radome comprises a rotateable former 1, an annular spider 3 supporting a plurality of asymmetrically spaced filament guides 19 movable so as to be able to traverse the length of the former to a position beyond the closed end thereof, and an array of circumferentially spaced spigots 26 at or near the closed end of the body to retain laid fibres such that there is no slippage of fibres as they are laid over the closed end of the body.

14 Claims, 7 Drawing Figures

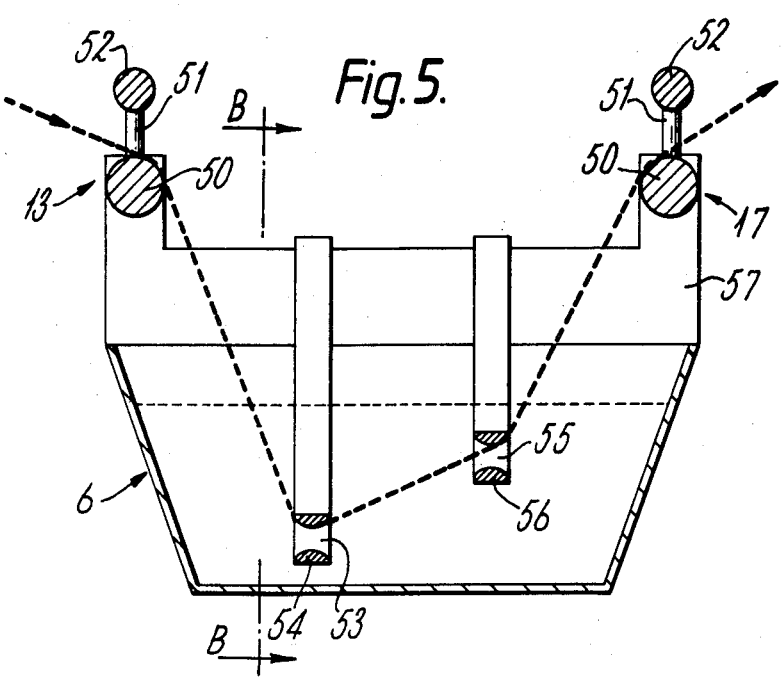
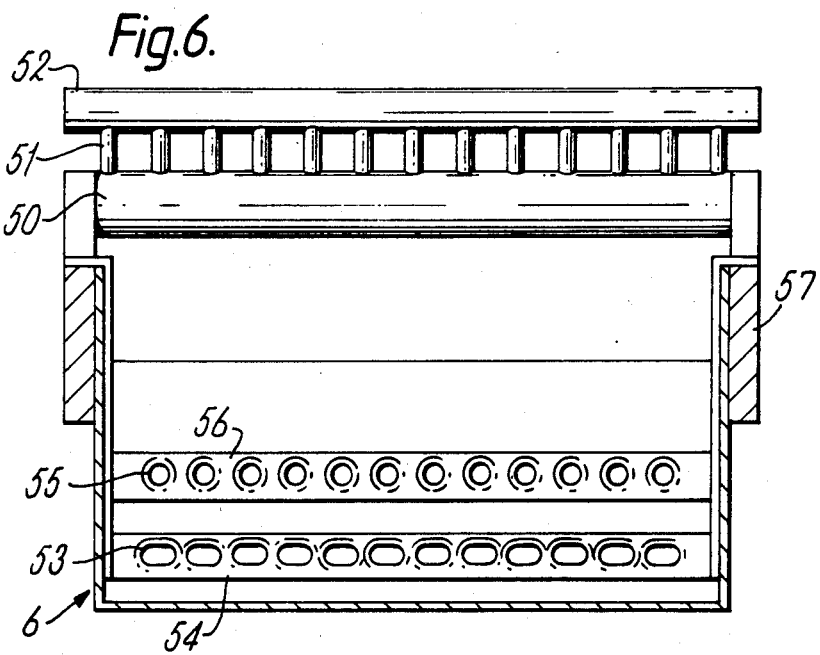

APPARATUS AND METHOD FOR FILAMENT WINDING CYLINDRICAL BODIES WITH CLOSED END

The invention relates to filament winding machines and in particular, though not exclusively, to machines for making fibre-reinforced cylinders.

Known filament winding machines, used for example for glass reinforced plastics (GRP), are capable of winding cylinders by winding a resin-coated glass fibre on to a rotating mandrel or former and subsequently curing the resin to form the cylinder. In some applications, for example, radomes or pressure vessels, it is desirable to be able to produce cylinders with hemisperical closures. The known machines can partly wind over a hemispherical former, but a circular plate is used to complete the closure. The windings over the hemispherical portion however tend to resemble windings on a cotton reel as the radius decreases and thus greater reliance is placed on the shear strength of the filament rather than the greater hoop strength is low the hemispherical portion is relatively weak in the region of the circular plate. Glass fibre reinforced radomes for submarines manufactured using conventional filament winding machines have been prone to fracture in this region of relative weakness to axially applied forces. In addition to this inherent weakness, radomes made using conventional cylinder winding filament machines also require 2-3 days to manufacture.

Because of difficulties encountered with conventional filament winding or laying machines, randomes are commonly made using hand laying with each layer being separately cured. This can take up to fifteen days and leads to products which are weaker than theoretically possible because the cohesion between layers is less than the cohesion within each layer.

The object of the present invention is to provide a filament winding machine capable of winding cylindrical bodies closed at one end and to reduce the time required therefor.

The term cylindrical used herein is intended to cover hollow bodies which may have circular or non-circular cross-sections.

In one form the invention provides a filament winding machine for winding cylindrical bodies closed at one end comprising means to support a former at one axial end thereof, means to guide at least one filament in spaced relationship to the former, means to reversibly move the filament guide means relative to the former such that the filament guide means traverses the length of the former from the supported end to a position beyond the remote end, means to rotate the former relative to the filament guide means about an axis parallel to the traversing movement and a circumferential array of filament guides attached to the former near the end remote from the supported end to restrict movement of the filament wound on to the former as the filament guide means traverses beyond the end of the former whereby on reversal of the traverse movement the filament is laid over the end of the former.

The invention may be used for making glass-fibre reinforced radomes, when by controlling the traversing movement and former rotation the filament can be continuously laid over the whole surface of a radome former.

In a particularly advantageous form the filament guide means comprises an annular spider supporting a plurality of circumferentially spaced filament guides whereby a plurality of filaments can be wound simultaneously on to the former. By adopting an asymetric distribution of filament guides, uniform cover of the former by the wound filaments may be more readily achieved. Preferably each filament guide includes a tensioning device. The tensioning device may comprise a resiliantly biased fairlead. Preferably the fairlead is satin-finished stainless steel and non-rotating. Each filament may also carry a weight loaded pulley to maintain correct tension. Where each filament comprises a plurality of individual fibres there is preferably included a resin bath for loading the filament with resin having a means to splay out the fibres to improve the resin loading of the filament. Advantageously the fibres are splayed out by including in the resin bath a filament guide having a slotted hole for each filament.

The traverse movement of the filament guide means relative to the former may be achieved by means of at least one lead screw parallel to the former axis engaging a helical screw thread on the filament guide means, although two are preferable when the filament guide is an annular spider. Advantageously microswitches are provided to sense the end of each transverse movement of the filament guide means.

The invention also provides a method of filament winding a hollow body with a closed end comprising the steps of:

(a) supporting a former at one end;
(b) providing circumferentially spaced filament retainers near the opposed end of the former;
(c) rotating the former about its longitudinal axis; and
(d) laying at least one filament on the former by a filament guide means which traverses the former parallel to the longitudinal axis between the supported end of the former and a position axially spaced above the end of the former;

the rotation of the former and the traversing of the filament guide means being selected for controlling the lay angle of the filament on the former up to the filament retainers and also over the end of the former.

Preferably a plurality of filaments are laid simultaneously by providing a plurality of filament guides which traverse the former. Advantageously the tension in each filament is maintained substantially constant. In a preferred method, each filament comprises a plurality of fibres which are loaded with resin by splaying out the individual fibres within a resin bath. The curing time of the resin is preferably selected to be greater than the time taken to wind the complete hollow body.

Upon completion of the body winding, before curing of the resin, circumferential rovings are wound on either side of the spigots and then the spigots are removed.

During the curing process, resin migration occurs to fill the holes left by the spigot removal. In order to maintain its form the body is rotated on the machine until the curing is complete. After, curing, a recess groove is formed along the line of the spigots which is then filled by winding in further filaments as a guard against porosity.

In order that the invention may be more clearly understood one embodiment thereof will be described by way of example only with reference to the accompanying drawings of which:

FIG. 1a is a schematic view of the former shown in FIG. 1;

FIG. 5 is a sectional view through the resin bath; and

FIG. 6 is a perpendicular sectional view taken along B—B in FIG. 5.

Figure 1:
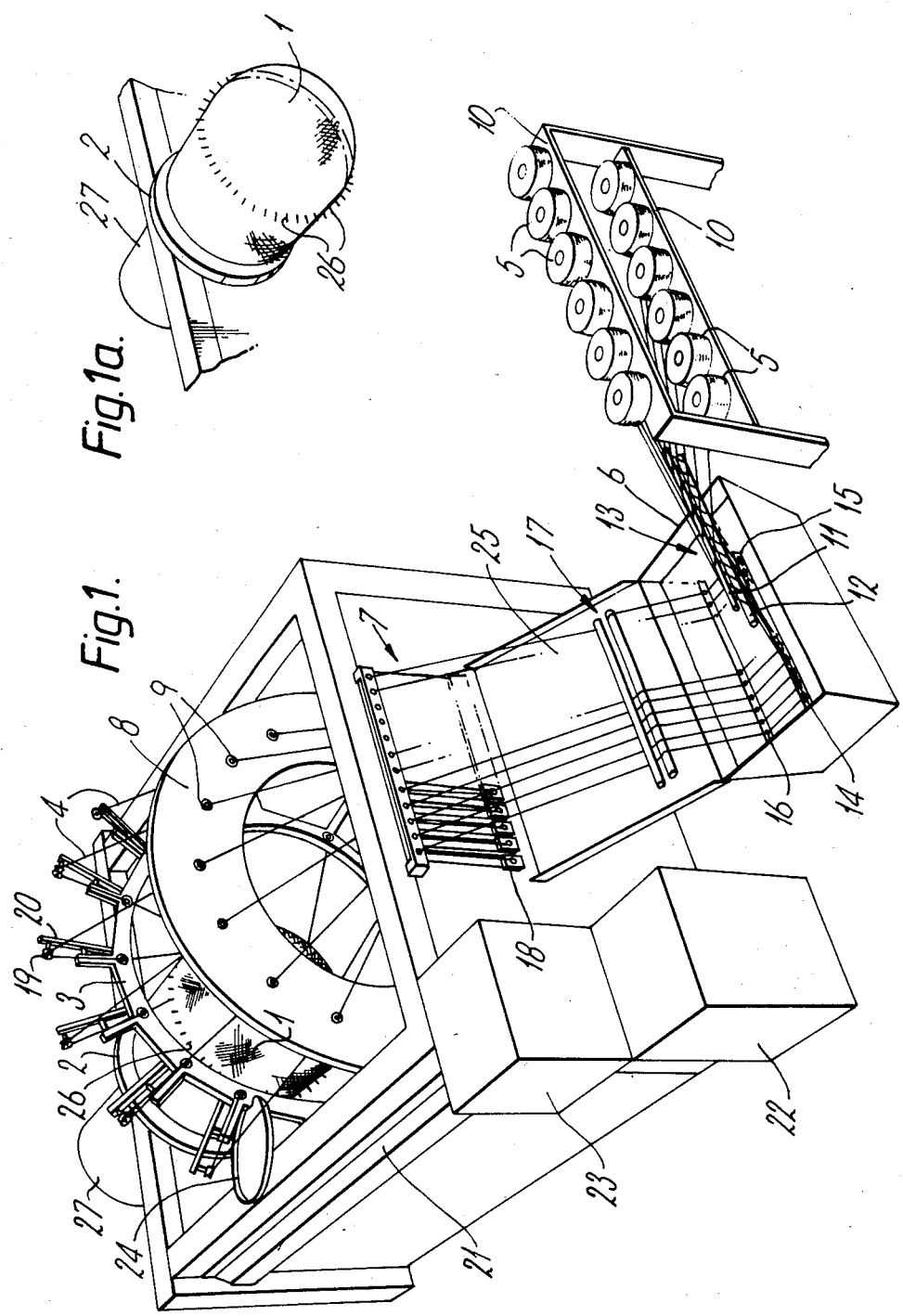
FIG. 1 is a schematic view of the filament winding machine.

FIGS. 1 and 1a show the complete filament winding machine while FIGS. 2 to 6 show parts thereof in greater detail. Referring particularly to FIG. 1, there is shown a former 1 for a radome mounted on a base plate 2 for axial rotation about a horizontal axis. The radome former 1 has a cylindrical portion, one end of which is attachable to the base plate 2 and the other end has a generally hemispherical dome. A circular moveable filament guide means 3 is provided coaxial with the rotational axis of the radome former 1 to support a number of glass fibre filaments 4 radially spaced above the former. In the preferred arrangement twelve filaments 4 are used and each filament is drawn from a respective spool 5, through a resin bath 6, via a tensioning device 7 and through a fixed circular guide 8 provided with twelve eyelets 9 therefor to the moveable guide 3.

The glass fibre spools 5 are mounted on two shelves 10, one above the other, for free rotation about respective vertical axes. Each fibre filament 4, comprising a number of glass fibres, passes under and over respective bars 11, 12 of a first resin bath guide 13 and thence to a respective elongated aperture 14 in a second resin bath guide 15. The second guide 15 is submerged within liquid resin and the elongated aperture 14 splays out the individual glass gibres to ensure thorough wetting of the glass fibres of the filament 4 as they are drawn through the resin. The filaments pass through circular apertures in a third submerged guide 16 and then through a fourth guide 17 similar to the first guide 13.

The resin-soaked filaments 4 are tensioned by means of weights 18 in the tensioning device 7, to be described later in greater detail. The filaments then pass through the circularly disposed stainless steel eyelets 9 in the fixed guide 8. The eyelets 9 are arranged, as shown, with seven equispaced around the upper hemicircle and five equispaced around the lower hemi-circle as will be explained later. From the fixed guide 8 the filaments pass over fair leads 19 and are then wound onto the radome former 1. The fairleads 19 on sprung arms 20 are pivotally mounted on the moveable guide 3 to retain tension in the filaments as they are wound onto the former. The filament guide 3 is traversed back and forth along the length of the radome former 1 by means of two lead screws (not shown). The lead screws are positioned one at each side of the filament winder under a protective cover 21. The lead screws are coupled by a 'Renold' chain drive with a tensioner and are driven via a belt drive between an electrical motor and a pulley respectively indicated by 22 and 23. Splash guards 24 and 25 are provided.

In operation the guide 3 is moved to the extremity of its traverse movement nearest to the fixed guide 8. In this position the guide 3 is axially spaced above the dome of the former 1. The ends of the filaments 4 are knotted and the spacer 3 is traversed in the direction of the base of the former 1 until each filament passes between a respective pair of radially extending filament movement restrictors or guide spigots 26 which are equi-spaced around the circumference of the former 1 near the base of the hemispherical domed head. The spigots serve to retain the positions of the filaments over the hemispherical dome. The spigots are all of the same height so that each catches approximately the same number of filaments. The guide 3 then traverses the length of the cylindrical portion of the former 1 while former 1 is rotated by the motor 27. The rotational motor 27 and the traverse motor 22 have their speeds adjusted to determine the lay angle of the filaments wound onto former 1. On reaching the extremity of the traverse base of the former 1 the direction of traverse of the guide 3 is reversed to lay a second layer of filaments on the first. Rotational movement of former 1 is continued until just after the filaments are again engaged by the spigots 26. After reaching the end of this traverse further controlled rotation of former 1 causes the filaments to be crossed over the surface of the dome on reversal of the traverse movement with each filament becoming engaged between a different respective pair of spigots. This series of steps is continued until the required thickness is obtained. The curing time of the resin in the resin bath 6 is chosen to be long enough, for example about 15 hours, so that a complete radome can be produced within the selected curing period.

The line of spigots 26 is removed prior to curing but after overwinding on either side of the spigots. After removing the spigots rotation of the body is continued during the curing process. Migration of the resin occurs to fill in the holes left by the spigots and the rotation aids uniformity. After curing a recess groove is cut around this line of filled holes and resin-soaked glass filaments are wound around the radome to fill the groove as a guard against porosity. The angle of the filaments over the hemispherical head of the radome can be controlled by the amount of rotation of the radome former which takes place in the time between successive passes of the filaments between the spigots 26.

Figure 2:
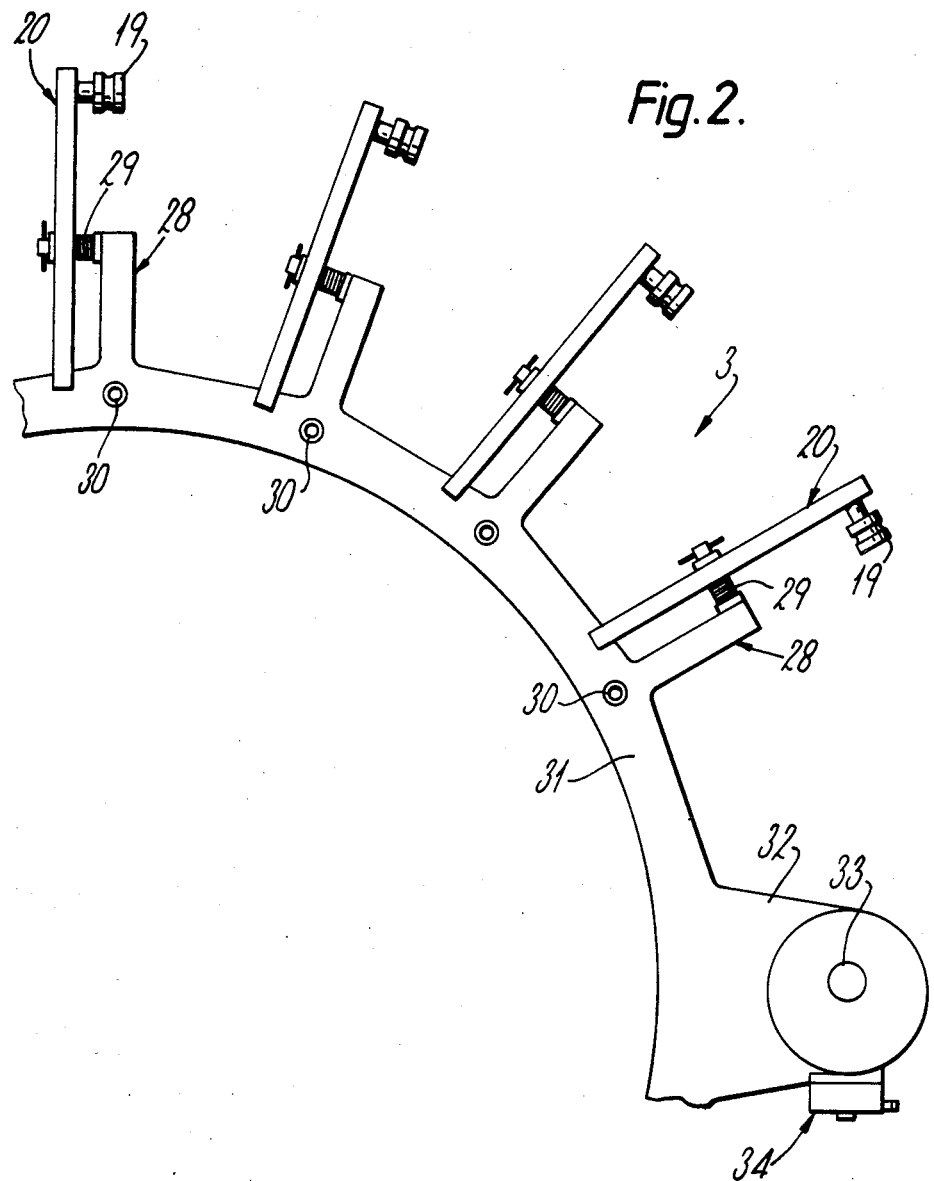
FIG. 2 is a part plan view of the moveable filament guide.

As seen in greater detail in FIG. 2 the moveable guide 3 has aluminium alloy tensioner arms 20 rotatably mounted on radially extending spokes 28 of an annular spider 31. Each arm 20 is biassed to the radial direction by a helical spring 29. The fairlead 19 on each tensioner arm is non-rotating and made of stainless steel. Radially aligned with each fairlead 19 is a stainless steel bush 30 provided in the annular spider 31. Resin-loaded fibres pass over the fairlead 19 and then through the bush 30 before being wound onto the former.

In each of two diametrically opposed positions of the spider 31 a radial projection 32 provides a helically threaded aperture 33 for a traversing leadscrew. A micro-switch cam 34 is also attached to the projection 32 for controlling the traverse movements of the guide 3.

Figure 3:
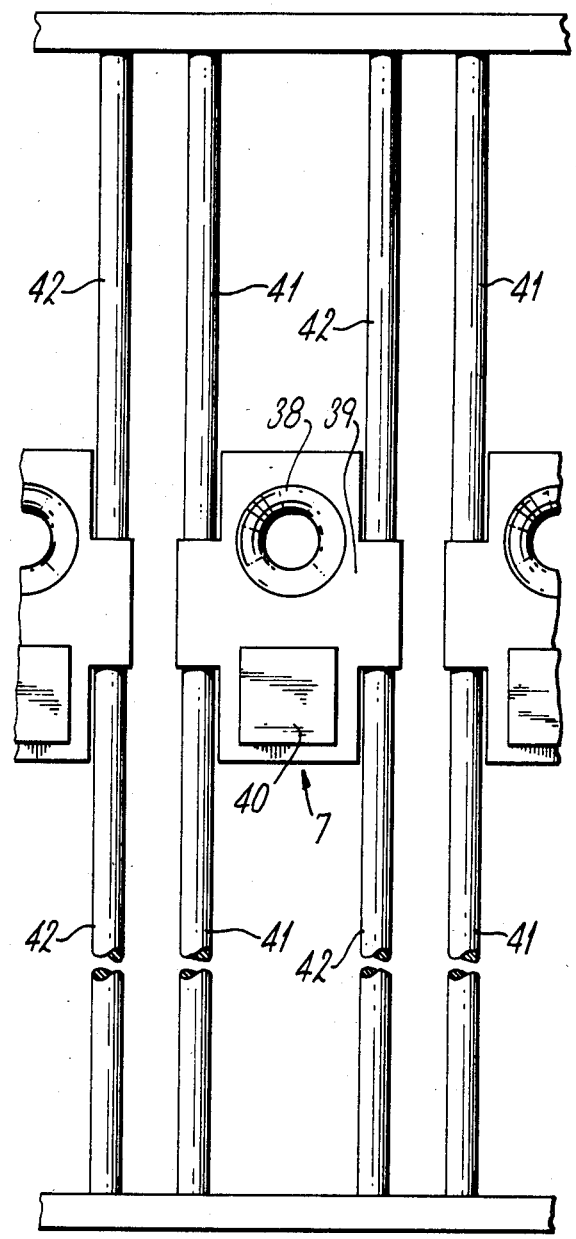
FIG. 3 is a part plan view of the filament tensioner assembly.
Figure 4:
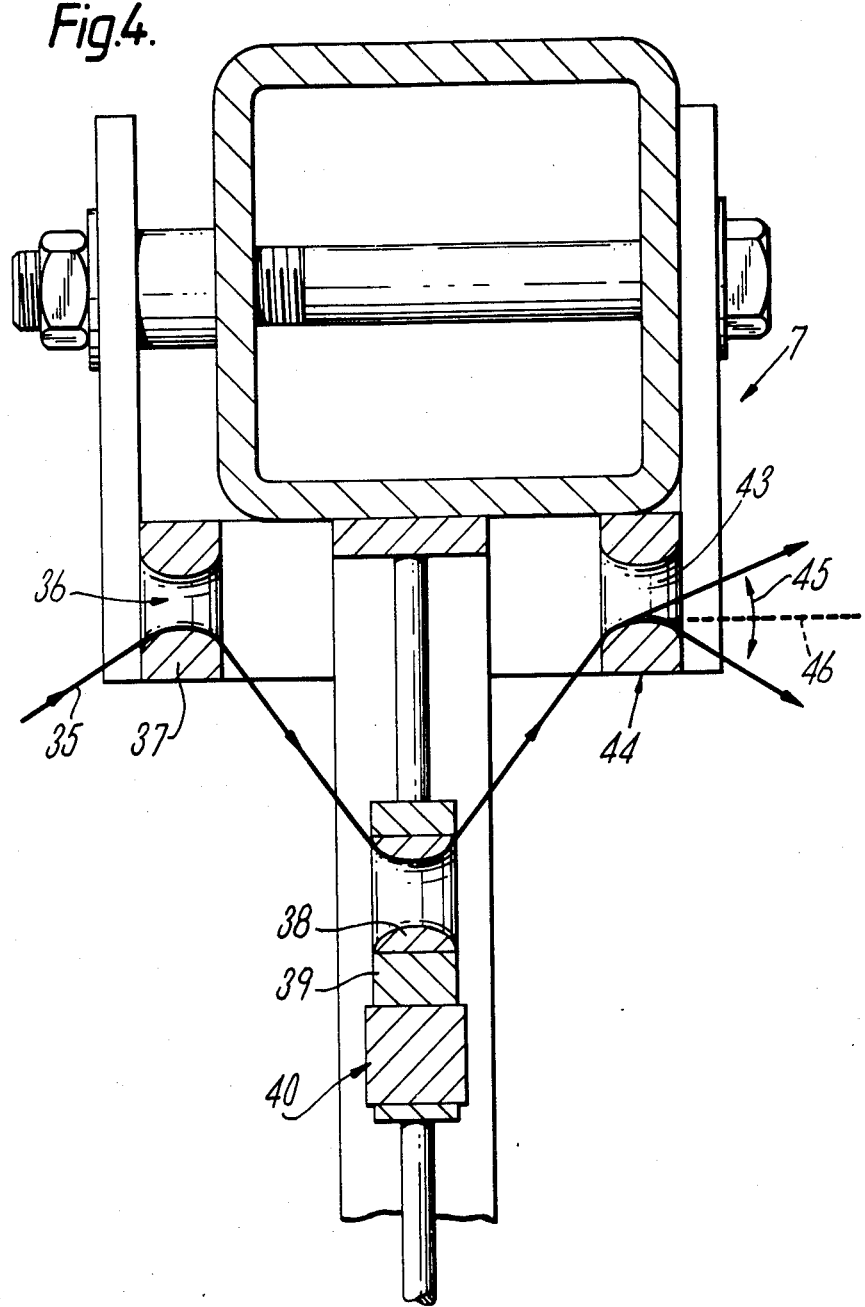
FIG. 4 is a sectional view through a tensioner of the FIG. 3 assembly.

FIGS. 3 and 4 show details of the tensioner device 7. Filaments 35 from the resin bath pass through respective holes 36 in a first stainless steel bar 37. Each filament then passes through a hole in a stainless steel bush 38 in a slider 39 weighted by a lead weight 40 and arranged to slide freely between vertical wires 41, 42. Each filament then passes through a hole 43 in a second stainless steel bar 44. The tensioning device 7 is positioned approximately level with a diameter through the fixed circular guide 8 such that the filaments leave the tensioning device within a range of angles 45 centred on the horizontal 46.

FIGS. 5 and 6 show the resin bath assembly. At the inlet and the outlet of the resin bath each filament passes over a stainless steel guide bar 50, passing between stainless steel rods 51 which are connected between the guide bar 50 and brass bar 52. Each filament is then drawn through a slotted hole 53 in a stainless steel guide bar 54 which splays out the individual fibres of the glass filament inside the liquid resin. The glass fibre filament then passes through a circular hole 55 in a second stainless steel guide bar 56. The bars 50, 52 have a satin finish produced by sand-blasting before use. A steel frame 57 is located on top of the resin bath, supporting the parts of guide bars 50, 52 at respective ends and having the guide bars 54, 56 suspended therefrom. The first guide bar 54 with slotted holes is supported in a lower position than the guide bar 56 to enhance the splaying out of the fibres to improve wetting by the resin.

The filament bearing surfaces are all stainless steel and it has been found that these bearings are most effective and reliable when satin-finished and static. In order to ensure a uniform coverage of the former by the filaments it has been found desirable to dispose the individual filament guides asymmetrically on the moveable filament. Thus, in the embodiment described, seven filaments are disposed around one semicirle and five around the other.

The invention may be applied to the fabrication of bodies other than radomes where its advantage over prior art lies not only in being able to cover the closed ends of hollow bodies in a simple efficient manner but also it is capable of simultaneously winding many filaments thereby speeding up the fabrication process. It may also be used to wind filaments other than glass, as for example nylon, carbon and kevlar. The radome head although described as hemispherical may generally be formed with a flattened head as it has been discovered that this leads to the greatest strength.

I claim:

1. A method of filament winding a hollow body with a closed end characterised in that there are included the following steps:
   a. supporting a former at one end;
   b. providing circumferentially spaced filament retainers near the opposed end of the former;
   c. rotating the former about its longitudinal axis; and
   d. laying at least one filament on the former by a filament guide means which traverses the former parallel to the longitudinal axis between the supported end of the former and a position axially spaced beyond the end of the former;
the rotation of the former and the traversing of the filament guide means being selected for controlling the lay angle of the filament on the former up to the filament retainers and also over the end of the former.

2. A method as claimed in claim 1 wherein the curing time of the resin is selected to be greater than the time taken to wind the complete hollow body.

3. A method as claimed in claim 2 wherein the filament retainers are upstanding spigots and upon completion of winding the body and before curing of the resin, circumferential rovings are wound on one or both sides of the spigots and the spigots then removed.

4. A method as claimed in claim 3 wherein the body is rotated after removal of the spigots until curing of the resin is substantially complete, such that resin migration fills the holes left by the spigot removal in a substantially uniform manner.

5. A method as claimed in claim 4 wherein after curing of the resin a recess groove is formed along the line of the spigots and then the groove is filled by winding in further filaments as a guard against porosity.

6. A filament winding machine for winding cylindrical bodies closed at one end thereof, said machine comprising means to support a former, filament guide means to guide at least one filament in spaced relationship to the former, means to reversibly move the filament guide means relative to the former such that the filament guide means traverses the length of the former and means to rotate the former relative to the filament guide means about an axis parallel to the traversing movement, wherein the improvement lies in that:
   the former is secured to a support at one axial end, the remote end being free; a circumferential array of filament retainers is attached to the periphery of the former near said remote end to limit slippage of the filament as it is laid between pairs of adjacent filament retainers; and the means to move the filament guide means traverses to a position beyond said remote end of the former whereby the filament is wound over the end of the former.

7. A filament winding machine as claimed in claim 1 wherein the filament guide means comprises an annular spider supporting a plurality of circumferentially spaced filament guides whereby a plurality of filaments can be wound simultaneously onto the former.

8. A filament winding machine as claimed in claim 7 wherein the filament guides are distributed asymmetrically around the spider.

9. A filament winding machine as claimed in claim 8 wherein each filament guide includes a tensioning device.

10. A filament winding machine as claimed in claim 9 wherein each filament guide comprises a non-rotating satin-finished fairlead.

11. A filament machine as claimed in claim 10 wherein there is included a resin bath and means to splay out individual fibres of each multi-fibre filament to improve the resin loading of the filaments prior to laying on the former.

12. A filament winding machine as claimed in claim 6 wherein each filament guide includes a tensioning device.

13. A filament winding machine as claimed in claim 12 wherein the filament guide comprises a non rotating, satin-finished fairlead.

14. A filament winding machine as claimed in claim 13 wherein there is included a resin bath and means to splay out individual fibres of each multi-fibre filament to improve the resin loading of the filaments prior to laying on the former.

* * * * *